United States Patent [19]
Kunzfeld

[11] Patent Number: 5,341,674
[45] Date of Patent: Aug. 30, 1994

[54] METHOD AND ARRANGEMENT FOR WARMING UP INTERNAL COMBUSTION ENGINES ON A TESTING STAND

[75] Inventor: Wilhelm Kunzfeld, Graz, Austria

[73] Assignee: AVL Gesellschaft fuer Verbrennungskraftmaschinen und Messtechnik mbh. Prof. Dr. Dr. h.c. Hans List, Graz, Austria

[21] Appl. No.: 849,888

[22] Filed: Mar. 12, 1992

[30] Foreign Application Priority Data

Mar. 13, 1991 [AT] Austria ............... A 563/91

[51] Int. Cl.$^5$ .................................... G01M 15/00
[52] U.S. Cl. .................................................. 73/116
[58] Field of Search ............... 73/116, 865.6, 117, 73/117.1

[56] References Cited

U.S. PATENT DOCUMENTS

| | | | |
|---|---|---|---|
| 2,357,625 | 9/1944 | Armbruster | 73/117.1 |
| 4,249,491 | 2/1981 | Stein | 123/142.5 R |
| 4,258,677 | 3/1981 | Sanders | 123/142.5 |
| 4,466,294 | 8/1984 | Bennington et al. | 73/116 |
| 4,538,097 | 8/1985 | Tourneur | 318/490 |
| 4,941,347 | 7/1990 | Iijima et al. | 73/116 |

FOREIGN PATENT DOCUMENTS

| | | |
|---|---|---|
| 77952/87 | 6/1989 | Australia . |
| 965002 | 5/1957 | Fed. Rep. of Germany . |
| 3032090A1 | 4/1982 | Fed. Rep. of Germany . |
| 58-219433 | 12/1983 | Japan . |
| 0165530 | 8/1985 | Japan ........................... 73/116 |
| 61-234333 | 10/1986 | Japan . |

*Primary Examiner*—Robert Raevis
*Attorney, Agent, or Firm*—Hill, Steadman & Simpson

[57] ABSTRACT

A test stand for testing multiple engines which may be liquid cooled or air cooled including apparatus for preheating a liquid coolant to preheat the engine prior to testing, apparatus for heating lubricant for preheating the engine prior to testing, apparatus for conserving the heat through heat exchangers to heat the coolant and the lubricant for a supply of coolant and lubricant for testing a successive engine; a brake and drag for the engine arranged for generating electricity to obtain electrical energy from the testing forces. For an air cooled engine, a throttle arrangement is added to block the air for a fast heating of the engine prior to testing. In one form, lubricant is bypassed from the sump up to the head of the engine and heated in the bypass such as by a heat exchanger energized by heat from the coolant from testing a previous engine.

12 Claims, 2 Drawing Sheets

METHOD AND ARRANGEMENT FOR WARMING UP INTERNAL COMBUSTION ENGINES ON A TESTING STAND

BACKGROUND OF THE INVENTION

The invention relates to improvements for testing multiple engines on testing stands.

More particularly, the invention relates to engines to be tested which are cooled by a liquid coolant or by air coolant that are lubricated with an arrangement for warming the internal combustion engines on the testing stand in an improved manner prior to a test load being applied.

The invention finds particular use in production testing stands on which newly manufactured internal combustion engines are broken in, tested, and set after being fully assembled. When no faults that must be corrected are diagnosed, and the engine approved, the dwell time of the individual internal combustion engine at the testing stand must be kept extremely short so that the testing costs remain low. Short residence times without sacrifices in testing quality are only possible when all operations to be implemented at the testing stand and particularly the break-in time are time minimized.

A shorter break-in time on such testing stands is only possible without the qualitative deterioration of the results is possible only when the respective internal combustion engine parts such as pistons, bushings and plain bearing location and parts that are subjected to friction are at satisfactory operation temperature.

What is referred to as the break-in period is divided into two stages. In the first stage, the operator waits for the warm-up of the engine according to the current state of the art by allowing the internal combustion engine to run at higher speed and without load. Thereupon the power of the internal combustion engine is gradually increased to maximum power and is held thereat at the second stage on the basis of testing various specific situations of speed and load. Since the gradient of the warm-up, the internal combustion engine is dependent both on the internal power loss as well as the externally supplied heat on the motor mass, internal combustion engines having fewer cylinders and a lower nominal speed are great disadvantages in the warm-up in comparison to engines having more cylinders and higher nominal speeds. In particular, internal combustion engines running at lower nominal speeds in comparison to the maximum speed allowed often force the operator to accept a warm-up phase on the order to 15 through 25 minutes in the methods heretofore used and this drives the testing cost significantly higher.

It is accordingly an object of the present invention to avoid the disadvantages of the two stage testing operation and to obtain a shortening of the warm-up of the parts of the internal combustion engine to attain operating temperature.

A further object of the invention is to provide an overall improved testing method and apparatus for testing which shortens the time on the test stand and which has no negative influence on the quality of the testing or on the functioning of the parts of the tested internal combustion engine.

A still further object of the invention is to provide an improved means of rapidly conditioning an engine on a test stand to place it in condition for testing and to do this with the conservation of heat energy generated in the coolant and lubricant during the testing period.

FEATURES OF THE INVENTION

In accordance with the present invention, the test engine, as with previous methods, has a predetermined optimum reference temperature. This preferably approximates the temperature of the lubricant during normal operation. During the testing operation, heat is generated in the engine which has to be eliminated via the coolant stream. This heat elimination is reversed or conserved in order to supply a preheat to the lubricant and to the coolant and such preheat is utilized in speeding the engine through phase 1 to bring it to condition for testing. Also, the conservation of heat or heat elimination is utilized as it is generated in the lubricant. The power loss of internal combustion engines is increased by applying a drag means with a speed elevated in comparison to the nominal speed. This achieves a speed which is maximum corresponding to the speed allowed for the respective family of internal combustion engines being tested.

In addition to the principle of utilizing the reversal of heat elimination or the conservation of heat energy via the coolant or via the lubricant, the arrangement also utilizes the drag means which establishes a power loss for testing. In the arrangement presented, the internal combustion engine can be dragged at a speed that is elevated in comparison to the nominal speed.

In ordinary operation, when a combustion engine does not reach the operating temperature at a referenced location of the cylinder head with an 80% full load, within a time, for example of 7 minutes, energy is additionally supplied. In accordance with the invention, the energy is supplied to the internal combustion externally thereof via the coolant stream and via the lubricant. Also, energy is supplied by increased power loss by dragging the internal combustion engine above its nominal speed. The combination of the possibilities of bringing up the temperature of the engine can be specifically matched to a specific type of internal combustion engine so that apart from an optimally fast warm-up, the operator can accomplish an optimally identical warm-up for various internal combustion engines under test in order to make the testing operation more uniform.

In the liquid cooled internal combustion engine, the cooling spaces of the engine can be filled with and continually traversed by heated coolant at a temperature of approximately 80° C. In the arrangement of the invention, a heater arrangement is connected to the cooling spaces via connecting lines and a circulating arrangement for the coolant is provided. A warming up of the internal combustion engine occurs by supplying coolant from the heater regions. The engine is cooled by the coolant during normal testing operation assuring that testing conditions are largely the same as actual operation of the internal combustion engine.

Where an air cooled internal combustion engine is employed, the air throughput of the cooling air blower is reduced preferably by throttling thereby achieving somewhat the same results as with a preheated coolant.

The engine is further heated prior to operation by applying heat via the lubricant. This lubricant can be heated in a bypass conduit providing for lubricant circulation directing the bypass through a heater. Delivery of heat via the lubricant applies directly to the locations that produce frictional heat during normal operation of the engine so that a realistic warm-up of the internal combustion engine is achieved.

In a preferred arrangement of the invention, the coolant and/or lubricant heat which is obtained from the load phase of the testing is employed for heating up coolant or lubricant for a successive engine to be tested. What this means is that the heater means for the coolant and for the lubricant is partly supplied by the previous engine or by another engine being tested in parallel with it which is in the load phase. Heat which would otherwise be wasted, in the form of hot coolant which is obtained from the testing phase of engines on the testing stand, can thus be economically utilized for a new test engine to be warmed up. This new engine is filled and flooded with hot coolant. The utilization of coolant from engines being tested makes it possible to connect a greater plurality of testing stands in parallel with the reservoir which collects the heated coolant from test engines. The reservoir can be utilized either by its heat being transmitted through heat exchangers or by the coolant being reused in newly tested internal combustion engines. The heat is obtained from engines which are running in the load and which contribute their heat to heating the coolant.

An analogous arrangement works with the heating of lubricant which is heated from heat transmitted from lubricant of engines running in the test phase or the lubricant can be utilized with suitable heat exchangers to heat further lubricant or coolant.

Internal combustion engines that are to be tested are provided with openings which are utilized for emptying or refilling coolant or lubricant. In the case of lubricant, one of these openings preferably provides extraction at the lowest point of the oil pan. In accordance with the present invention, this oil is returned via a conveyor pump and a heat exchanger to the highest level of the internal combustion engine which is usually the valve bonnet. This heated lubricant thus obeys the plain bearing locations and the crank of the internal combustion engines to quickly bring them up to operating temperature.

In a further concept of the arrangement of the invention, drag means are provided for applying a load for testing the motor and these drag means include an electric motor connected with a brake means. This arrangement has an output of electrical energy during braking operation. With internal combustion engines tested in parallel, the heating generated by the braking provides the electrical energy for the operation of the drag means. It is not critical whether the electrical energy obtained during the braking in the load phase can be employed for actuating the drag means either directly or as suitable storage means such as accumulators and the like. What is important is that at least a part of the energy arising from the braking operation in the load phase can be meaningfully reemployed for warming up the engine on the basis of the method and apparatus.

Other objects, advantages and features will become more apparent with the teaching of the principles of the invention in connection with the disclosure of the preferred embodiments thereof in the specification, claims and drawings, in which:

DESCRIPTION OF THE PREFERRED EMBODIMENTS

Figure 1:
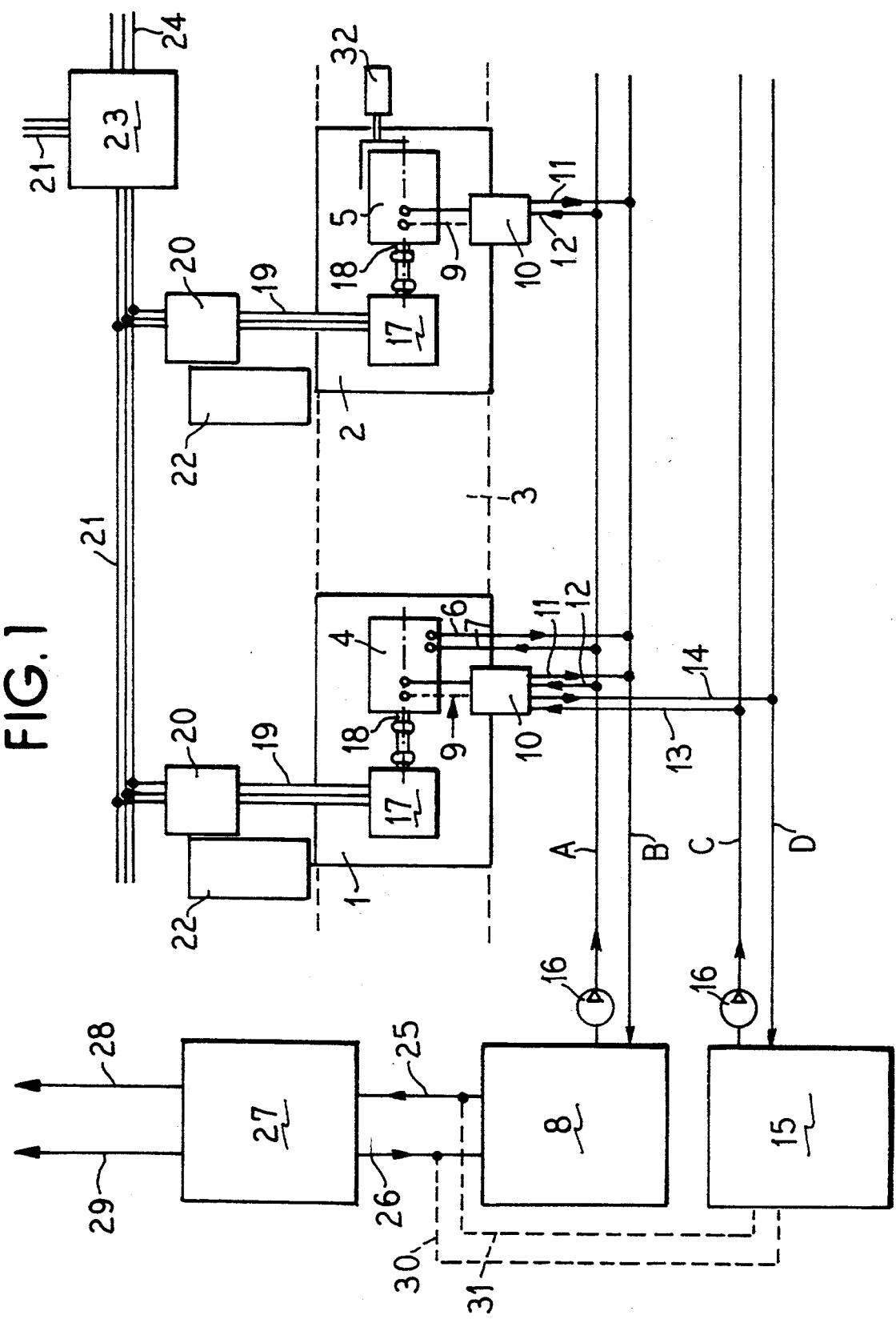
FIG. 1 is a diagrammatic showing of parallel engines on test stands with arrangements for preheating the engines to employ the conservation of energy and shorten the test stand residence time.

FIG. 1 illustrates diagrammatically the present invention as employed in a testing stand lane where two test stands are shown in side-by-side arrangement at 1 and at 2.

Figure 2:
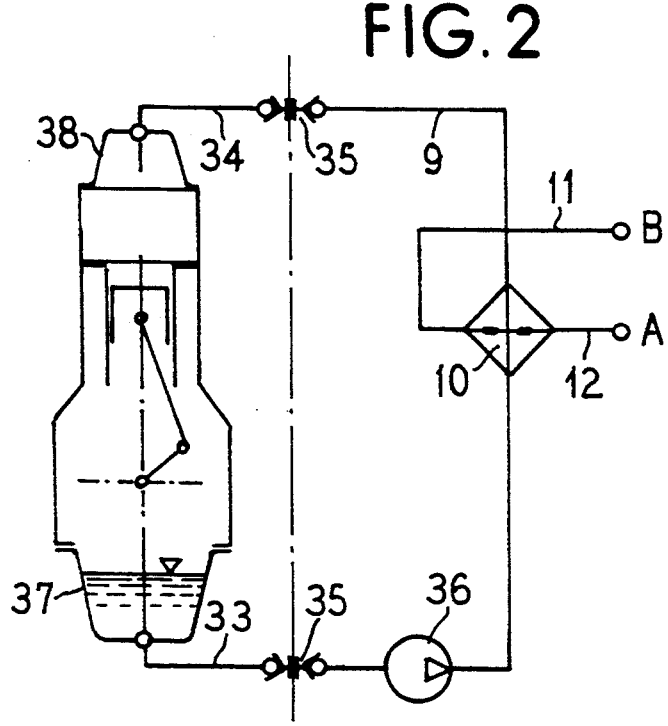
FIG. 2 is a partial view in schematic form of an arrangement for heating the lubricant.
Figure 3:
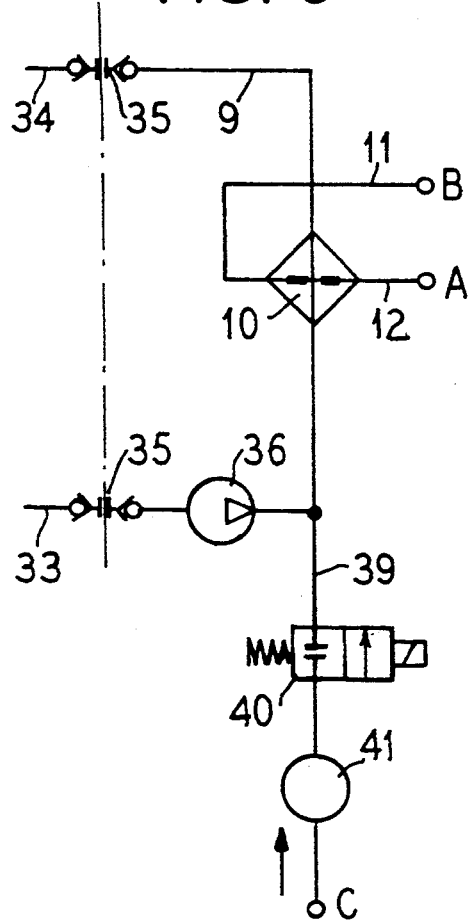
FIG. 3 is another diagrammatic view showing an arrangement for heating the lubricant.
Figure 4:
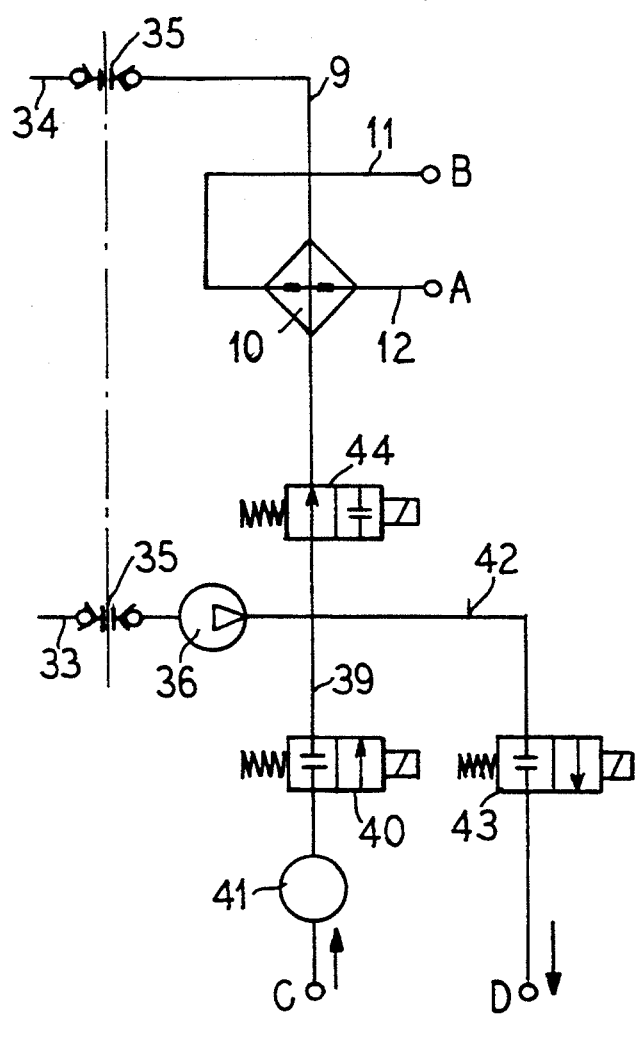
FIG. 4 is a still further arrangement for heating the lubricant.

FIG. 2 illustrates an example of a lubricant heating circulation of an arrangement of the invention. FIGS. 3 and 4 show further modifications or expansions of the arrangement of FIG. 2.

The testing stands of FIGS. 1 and 2 are part of a testing lane where multiple additional stands may be employed utilizing the principles described in connection with the two stands. These production testing stands are utilized for newly manufactured internal combustion engines such as 4 and 5 wherein they are broken in, tested and set or approved after being completely assembled. The internal combustion engine illustrated at 4 is liquid cooled. The coolant from the cooling spaces are in communication with a collecting tank 8 via connecting lines 6 and 7 and main header lines A and B. The collecting tank normally contains coolant such as water heated to approximately 80° C.

The internal combustion engine 4 is also lubricated with a liquid lubricant such as oil. The lubricant circulation is fed from a sump below the engine and is branched off via a bypass line 9 and heated in a heater arrangement 10 as illustrated in each of the Figures. The heater arrangement is again connected via lines 11 and 12 to collecting lines A and B which have heat and coolant which in turn is utilized for warming the lubricant which flows through the bypass line 9 through the heat exchanger in the heater 10.

Lubricant connecting lines 13 and 14 are connected to the heater 10 for the initial supply or first filling of the internal combustion engine 4 on the testing stand 1. These lubricant connecting lines 13 and 14 are fed from header lines C and D which lead to a lubricant tank 15. The lubricant supply tank 15 is maintained at a normal heated engine temperature and supplies oil to each new engine as it is brought up to temperature and provides the lubricant for the engine.

Pumps 16 are provided for supplying and circulating the coolant through line A and also another pump also numbered 16 is provided for circulating the lubricant from the lubricant tank 15.

The testing stand 1 also includes an electrical braking and drag unit 17. This is usually mechanically coupled to the crank shaft 18 of the internal combustion engine 4. The unit 17 is in communication with the in-house electrical wiring 21 via a control unit 20. A program controller 22 of the testing stand controls the testing sequence and employs additional detailed measuring equipment which is not shown for the sake of clarity but will be fully understood by those versed on the art of engine testing.

The in-house electrical wiring 21 is connected by an external network 24 via a unit 23 which would contain equipment such as a transformer, a load distributor and potentially a suitable energy buffer. The electrical energy acquired via the braking and drag unit during braking operation can be potentially resupplied into the external network 24.

The collecting tank 8 for the heated coolant is connected via lines 25 and 26 to a heat exchanger unit 27. This has an integrated temperature control that enables either a heating of the collecting tank 8 or elimination of heat via line 28 to the building heating or via line 29 to the environment as needed. The excess heat will be generated, of course, by the continued operation of engines being tested, but the primary supply of this heat is utilized in the maintaining of the coolant in the collecting tank at 80° C. and if necessary, in the heating of the lubricant in the lubricant tank 15. The lubricant can be heated by the heat exchanger 27 via lines 30 and 31 which are shown in broken line illustration on FIG. 1.

Other testing stands at the testing stand lane 12 can be supplied which would be identical to the testing stand 1. These can be connected to the trunk lines A, B, C and D and also to the in-house electrical wiring 21. This provides the possibility of employing the coolant and lubricant heat as well as the electrical braking energy output from the testing stand. This heat is obtained during the load phase of internal combustion engines just being tested and the heat energy will be directed to each testing stand which receives a new internal combustion engine to be tested and which is just in the warm-up phase. The tanks 8 and 15 and the electrical network unit 23 are controlled and their output energy is utilized for each of the testing stands.

The testing stand 2 which is illustrated in FIG. 1 at the right of the testing stand 1 is identical in essential structure with the testing stand 1 and therefore identical parts are shown with the same reference numerals. The description of the operation of testing stand 1 will apply equally to the operation of testing stand 2.

In some instances, an air cooled engine will require testing and be placed on the testing stand 1. When an air cooled internal combustion engine is utilized such as illustrated schematically at 5 on test stand 2, a throttle arrangement 32 is provided for reducing the air throughput of a cooling air blower (not shown). For an air cooled engine, a blower will be the normal auxiliary on the engine and, of course, connecting lines such as 6 and 7 in FIG. 1 are not needed for coolant.

An automatically controlled cap means controls the air throttle arrangement insuring rapid preheating of the air cooled engine.

The air cooled engine 5 is also provided with heating means 10 for the lubricant supplied and circulated through header lines A and B. The lubricant supplied to the engine via the bypass line 9 is heated such as by a heated coolant of the collecting tank 8. As an alternative to the arrangement shown for testing stand 1, no connection of the heating means 10 to the lubricant collecting lines C and D may be provided. In this case, the internal combustion engine 5 is filled with lubricant independent of the lubricant tank 15.

In all instances of testing, a predetermined arrangement is made in advance of trial runs in accordance with the specific type of internal combustion engine to be tested. When the individual determination is made, a reference temperature needed for the coolant and for the oil is established and coolant and oil lubricant are rapidly supplied to the engine when it is placed on the test stand. In all instances, there is an objective of accelerating the testing mode as a realistic warm-up of the internal combustion engine to bring it to the operating temperature for implementing work at the testing stand. This is accomplished by the energy saving and environmentally safe arrangement above described.

In FIG. 2, an internal combustion engine 4 is illustrated where a bypass line 9 is connected by connectors 33 and 34. These may be arranged by quick release couplings so that an arrangement can be readily and quickly attached as the engine is placed on the test stand. The couplings allow immediate connection of the lubricant lines to the heater 10 which may be in the form of a heat exchanger utilizing oil or water as the heat exchange medium. The heater is shown in communication with the coolant tank via lines 11 and 12 which has the header lines A and B and is connected in the manner described in connection with FIG. 1. A lubricant pump 36 extracts lubricant from the lowest point of the oil pan 37 of the engine 4. After the oil is heated in the heating means, it is resupplied to the highest point at the engine usually at the valve cover 38. By delivering the heated oil, a simple and rapid heating of the plain bearings derives particularly at the cam shaft and the crank shaft of the engine.

As illustrated in FIG. 3, a change from the arrangement of FIG. 2 is illustrated where a line 39 is connected to the bypass line 9. The line 39 is in communication with the collecting line C, FIG. 1, to the lubricant supply through an electrically operated solenoid valve 40 and a quantity measuring meter 41. As an engine is loaded onto the test stand, for filling the new internal combustion engine, the quick action couplings 35 are attached, the solenoid valve 41 is opened and the quick quantity of new lubricant is supplied via the quantity meter 41. Since the lubricant has been preheated, the engine will be heated during the supply of the lubricant.

A further arrangement is shown in FIG. 4 which is modified over the arrangement of FIG. 3 and permits an emptying of the lubricant in addition to the filling thereof. Such emptying will occur after the internal engine has been broken in. In addition to the structure set forth in FIG. 3, a further line 42 is provided connected to the bypass line 9. The line 42 connects to a solenoid valve 43 which leads to the lubricant collecting line D of FIG. 1 for return to the lubricant tank. The electric valve 44 is located in the bypass line and closes during emptying.

In operation, coolant such as water will have been retained in the reservoir collecting tank 8 and heated lubricant will fill the lubricating tank 15. As a new engine is placed in the test stand 1, by quick connections the lines are connected thereto and heated coolant and heated lubricant are circulated through the engine rapidly bringing the engine up to operating temperature so that the testing phase can be begun as soon as possible. If an engine 5 has already been tested in the test stand 2, the heat generated during testing in the coolant will have been utilized by delivering the coolant back to the coolant collecting tank 8. During the test period, heat generated in the engine 4 both in the lubricant and coolant will be delivered from the lubricant to the lube tank 15 and by the coolant to the coolant tank 8. To utilize the excess heat in the coolant or in that which is needed to heat a new engine on the test stand, the coolant and lubricant deliver their excess heat to a heat exchanger 27 which can function to initially bring the coolant and lubricant up to the desired temperature and to maintain them at the desired temperature either by removing the excess heat or by adding heat. The heat exchanger can be supplied with heat energy from a main power source 23 and energy generated from the brake and drag arrangements at each of the test stands.

Thus, it will be seen there has been provided an improved test stand arrangement which meets the objectives and advantages above set forth and provides for reduced time of residence of engines in the test stand utilizing a conservation of energy and a conservation of time.

I claim as my invention:

1. A method of testing a plurality of internal combustion engines on a testing stand including at least one engine in operation and at least one engine not yet in operation comprising the steps:

extracting heat from coolant supplied to said engine in operation and supplying said extracted heat to coolant supplied to said engine not yet in operation for a fast engine warm-up;

extracting heat from lubricant supplied to said engine in operation and supplying said extracted heat to lubricant supplied to said engine not yet in operation for a fast engine warm-up;

and applying a drag load on said engine in operation whereby the load speed can be increased in testing said engine in operation.

2. A method of testing internal combustion engines on a testing stand in accordance with the steps of claim 1:

wherein the coolant supplied to the engine not yet in operation is supplied in a quantity to fill the engine and circulate therethrough and the coolant is heated to a temperature on the order of 80° C.

3. A method of testing internal combustion engines on a stand in accordance with the steps of claim 1:

wherein the lubricant is heated prior to being supplied to the engine not yet in operation in a bypass heat exchanger arrangement.

4. A method of testing internal combustion engines on a testing stand in accordance with the steps of claim 1:

wherein said heat extracted from the coolant and lubricant of the engine in operation and the heat quantity removed is retained for preheating coolant and lubricant for a successive test engine.

5. A method of testing internal combustion engines on a testing stand in accordance with the steps of claim 1:

wherein electrical energy is generated in braking the load on the engine in operation during a test phase and said energy is utilized for actuating a drag means for applying a load to a successive test engine.

6. A method of testing a plurality of internal combustion engines on a testing stand including at least one engine in operation and at least one engine not yet in operation comprising:

circulating air over said engine in operation for an air cooled effect;

preventing the circulation of air over said engine not yet in operation prior to operating said engine not yet in operation in a test phase;

extracting heat from lubricant supplied to said engine in operation;

supplying said extracted heat to lubricant for the engine not yet in operation for a fast engine warm-up;

and applying a drag load on the engine in operation for the test phase.

7. An apparatus for testing a plurality of internal combustion engines on a testing stand including at least one engine in operation and at least one engine not yet in operation comprising in combination:

a heat storage container connected to said engine in operation and said engine not yet in operation to extract heat from coolant delivered to said engine in operation and to deliver preheated coolant to said engine not in operation prior to its being operated for testing;

a heat storage container connected to said engine in operation and said engine not in operation to extract heat from lubricant delivered to said engine in operation and to deliver preheated lubricant to said engine not yet in operation prior to its being operated for testing;

and a drag means for applying a testing load whereby said engine in operation can be operated in excess of its nominal speed.

8. An apparatus for testing internal combustion engines on a testing stand constructed in accordance with claim 7:

wherein said heat storage container connected to extract heat from coolant comprises a heat exchanger for conserving heat obtained from the engine in operation during the testing phase.

9. An apparatus for testing internal combustion engines on a testing stand constructed in accordance with claim 7:

including means for removing coolant from the sump of said engine not yet in operation;

a heater connected to receive lubricant removed from the sump;

and a delivery line from the heater leading to an upper region of the engine for preheating engine operating parts.

10. An apparatus for testing internal combustion engines on a testing stand constructed in accordance with claim 9:

wherein the heater is energized by coolant from said engine in operation.

11. An apparatus for testing internal combustion engines on a testing stand constructed in accordance with claim 7:

wherein said drag means comprises means for generating electricity.

12. An apparatus for testing a plurality of air cooled internal combustion engines on a testing stand including at least one engine in operation and at least one engine not yet in operation comprising in combination:

means for circulating air over said air cooled engine in operation;

means for preventing said air circulation over said engine not yet in operation by a throttle arrangement for increasing the temperature of the engine not yet in operation prior to testing;

a lubrication heater connected to extract heat from lubricant supplied to said engine in operation and to deliver preheated lubricant to the engine not yet in operation prior to its operated for testing;

and a drag means for applying a testing load whereby the engine in operation can be tested in operation.

* * * * *